Patented Dec. 10, 1946

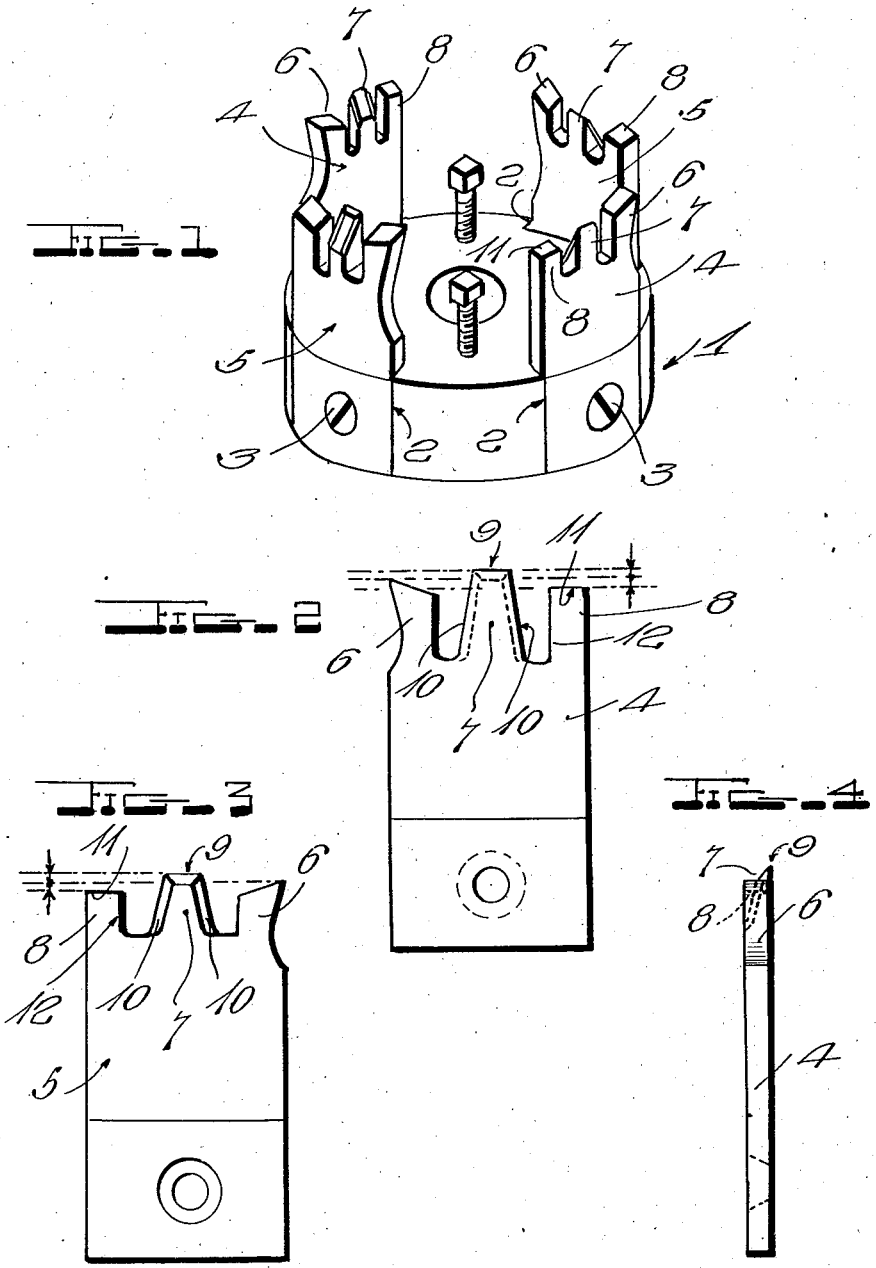

2,412,433

UNITED STATES PATENT OFFICE 2,412,433

CUTTER FOR RING GROOVING CUTTER HEADS

Andrew B. Taylor, Wauna, Oreg.

Application September 8, 1944, Serial No. 553,244

2 Claims. (Cl. 144—219)

This invention relates to improvements in cutters for ring grooving cutter heads, and has particular reference to improvements in cutters for use on cutter heads for the cutting of grooves for holding Teco ring connectors, such as are employed in the joints of timber structures to reinforce and increase the holding power of fastening bolts.

Cutters of this kind are used on which are known as 4-wing ring grooving heads, that is, a head carrying four cutters, two of which outline the outside diameter of the groove and the other two the inside diameter. These outside and inside cutters are generally alike in construction each comprising an arcuately curved blade having a series of three teeth, a head tooth or raker and middle and tail cutting teeth, the teeth of the outside and inside cutters differing only in the fact that the cutters cut in different circular paths and that their beveled cutting surfaces face in opposite directions. In such cutters as previously used, the truncate triangular middle and tail teeth of the series of teeth are of like depth and have their outer end edges or points disposed in the same plane and their end edges as well as their side edges are beveled or ground to form cutting surfaces, the intermediate and tail teeth operating to cut a side of the groove while the raker, whose point lies in a relatively depressed plane cuts the groove bottom.

An objection to cutters of this type is that the tooth construction provides no means for regulating the rate of cut and the cutters tend to jam or stall in the cut and to cause gouging, and such cutters tend to cut too fast or too slow according to the way in which the tool is ground and the textures of different woods.

The object of my invention is to provide a cutter which overcomes these objections and in which the tail or rear tooth is shorter than the raker and is constructed to form a rider which rests on the bottom of the cut and serves as a support which regulates the rate of cut according to how much shorter the rider is than the raker.

The invention consists in a cutter embodying the novel features of construction, combination and relationship of parts hereinafter fully described and claimed, reference being had to the accompanying drawing, in which:

Fig. 1 is a perspective view of a 4-wing cutter head of the character described provided with sets of groove forming cutters embodying my invention.

Figs. 2 and 3 are respectively face views of one of the outer cutters and one of the inner cutters.

Fig. 4 is an end view of one of the cutters looking toward the rear thereof.

Referring now more particularly to the drawing, 1 represents a cutter head of the type described, which is provided with recesses 2 to receive the butt ends of arcuate cutter blades, secured thereto by suitable fastening means 3. The cutter head is of four-winged type, that is, adapted to receive four cutters blades, arranged at equal intervals about the cutter blades. These blades comprise two blades 4 for defining the outside diameter of the groove to be formed in the work, and two blades 5 for defining the inside diameter of the groove. The blades are alike in form and construction except for the fact that the cutting surfaces of their teeth face in opposite directions or in opposed relation, as will be readily understood.

Each blade 4 and 5 is provided with a set or series of three teeth, to wit, a front or raker tooth 6, an intermediate cutting tooth 7, and a rear tooth 8. In a cutter blade of this type of ordinary construction, the teeth 7 and 8 are alike in form, each being, like the tooth 7, of truncate triangular form, of greater length or depth than the raker tooth 6 and having its outer end edge or point projecting beyond the horizontal plane of the point of the tooth 6, and having its end edge 9 and side edges 10 ground to beveled cutting surfaces. In other words, in a cutter blade of this type of ordinary construction the teeth 7 and 8 are both strictly cutting teeth.

In the operation with an ordinary cutter blade of the type set forth for cutting grooves, in which the teeth 7 and 6 are formed alike, and in which the tooth 6 forms the bottom of the cut, there are many difficulties encountered. As the cutting teeth and the raker all have sharp edges, and as the tooth 8 is of the same length as the tooth 7, which is longer than the tooth 6, there is nothing to regulate the rate of cut and the tool may cut too fast and too slow according to the way the teeth are ground and the textures of different woods, and the cutters tend to grab, jam and gouge, making the operation difficult, vexatious and sometimes dangerous to the operator.

I overcome these objections by giving a special form and construction to the tooth 8. In my cutter the teeth 6 and 7 are of conventional shape and length and ground in the usual manner, but the tooth 8 is made shorter than the tooth 7, and than the point portion of the tooth 6, and said tooth 8 is provided with a straight or square outer end edge 11 and with straight or square side edges 12. The tooth 7 in practice forms a rider which engages the bottom of the groove being formed and thus forms a stop or support which regulates the rate of cut, and this tooth may be made shorter than the raker 6 to such a degree that it will regulate the rate of cut according to how much shorter it is than the raker. As the rider rests on the bottom of the cut it will permit a shaving of only a certain thickness to be cut, and as a result the blade can be ground to cut at maximum speed without jamming or stalling in the cut or causing gouging. Grooves of the character referred to may accordingly be cut with greater ease and convenience and a marked increase in speed.

Having thus described my invention, I claim:

1. A groove forming cutter comprising a rotary cutter head carrying an annular series of groups of teeth arranged in successive order, each group embodying a front rake tooth, an intermediate cutter tooth, and a rear tooth shorter than the raker and forming a rider to engage the bottom of the groove being cut and to regulate the rate of cut of the blade, the cutter teeth of alternate groups of the series having cutting surfaces respectively facing inwardly and outwardly to form the inner and outer walls of an annular groove in the rotation of the cutter.

2. A groove forming cutter comprising a rotary cutter head carrying an annular series of groups of teeth arranged in successive order, each group embodying a front rake tooth, an intermediate truncate triangular cutter tooth, and a rear tooth having square end and side edges and shorter in both directions than the raker and forming a rider to engage the bottom of the groove being cut and to regulate the rate of cut of the blade, each cutter tooth having front and rear cutting edges converging from the base toward the top of the tooth and the cutter teeth of alternate groups of the series having cutting surfaces respectively facing inwardly and outwardly to form the inner and outer walls of an annular groove in the rotation of the cutter.

ANDREW B. TAYLOR.